Feb. 3, 1942.  C. D. KNOWLTON  2,271,559
CLUTCH
Filed Nov. 30, 1939   2 Sheets-Sheet 2
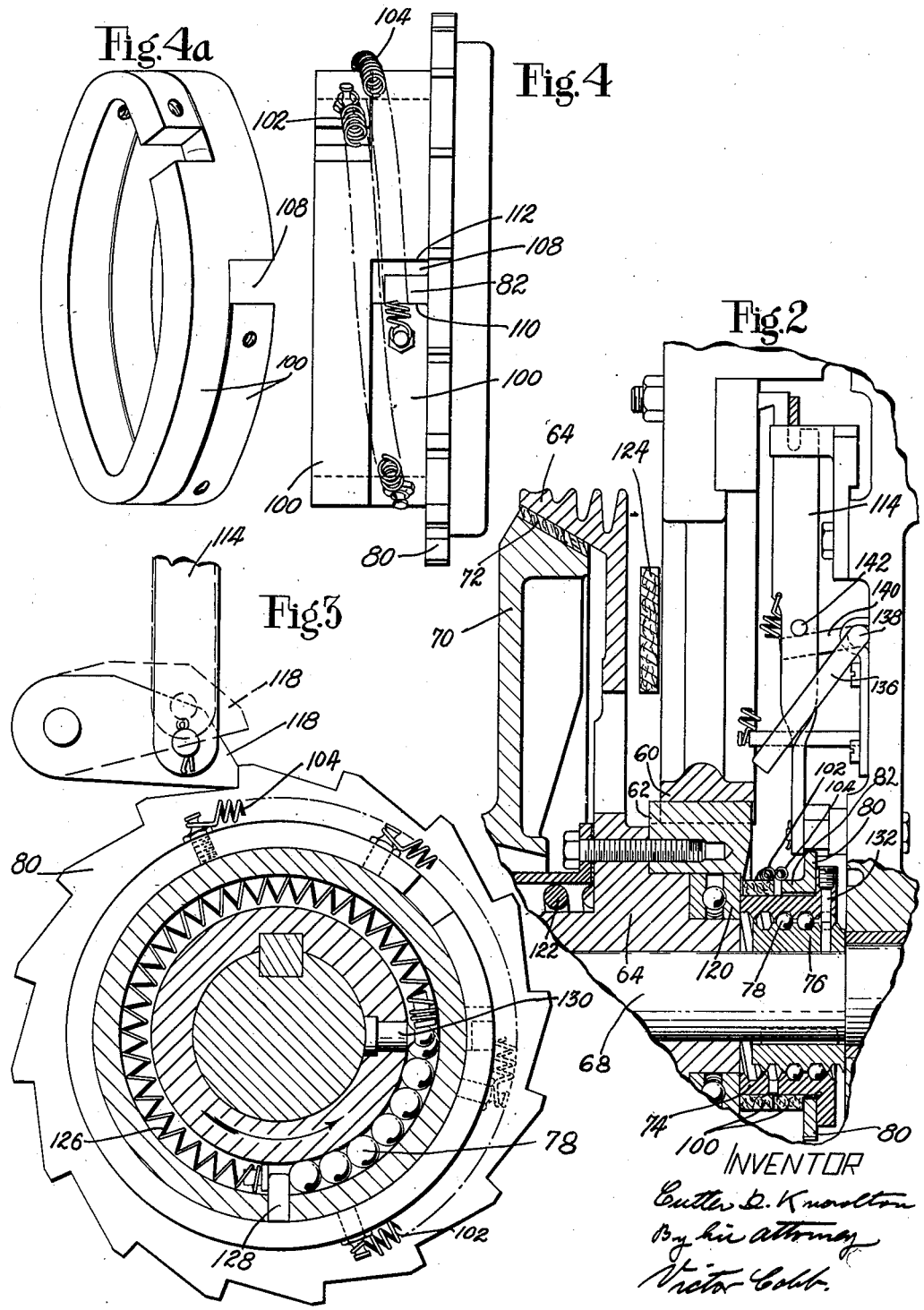
INVENTOR
Cutler D. Knowlton
By his attorney
Victor Cobb.

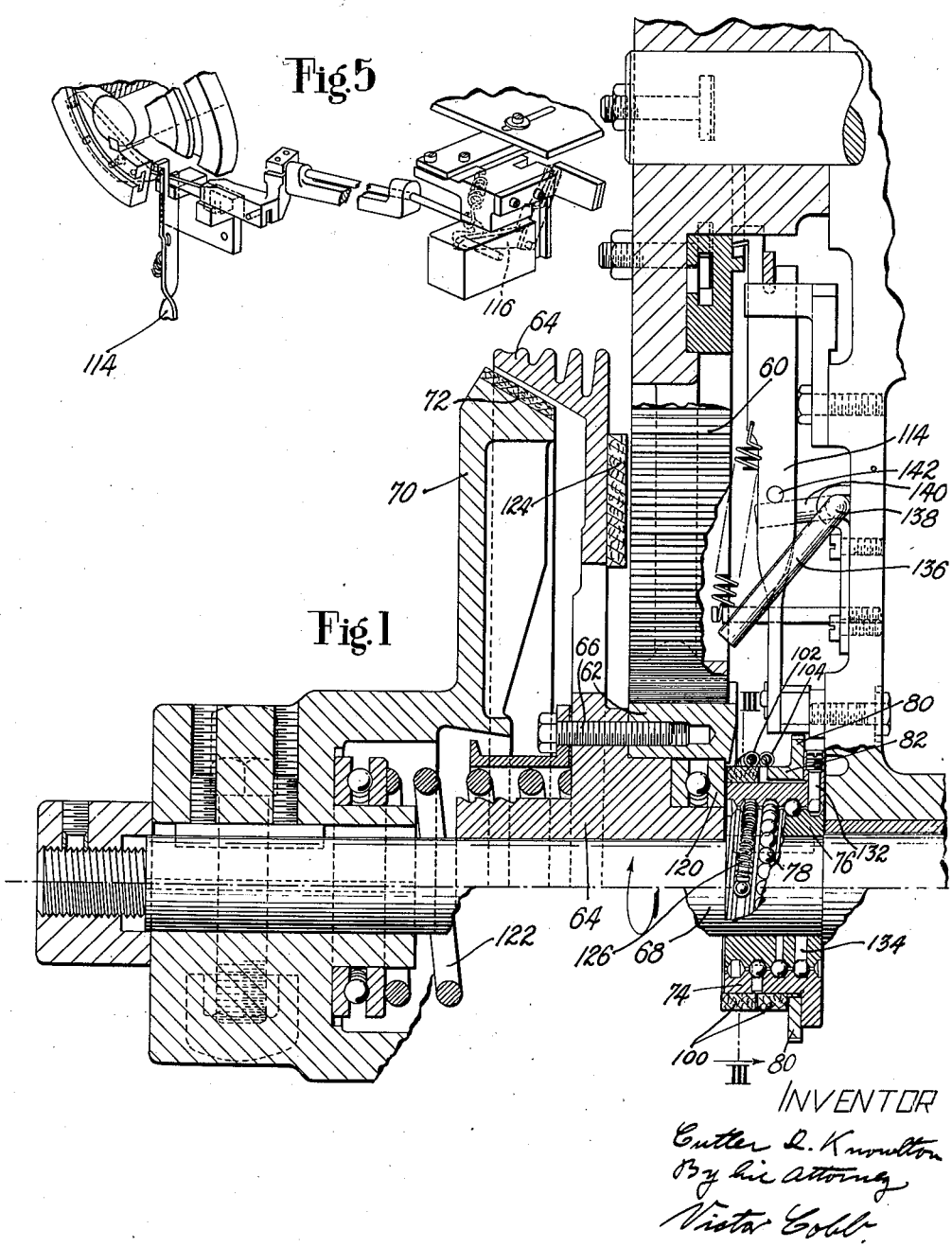

Patented Feb. 3, 1942

2,271,559

UNITED STATES PATENT OFFICE 2,271,559

CLUTCH

Cutler D. Knowlton, Beverly, Mass., assignor to Hoague-Sprague Corporation, Lynn, Mass., a corporation of Massachusetts Application November 30, 1939, Serial No. 306,792

4 Claims. (Cl. 192—36)

This invention relates to clutches and particularly to a clutch with a sensitive control through which engagement is initiated by a slight effort and in which the engagement is completed by a power-operated device which causes the clutch to become engaged with sufficient frictional force to drive the mechanism connected thereto.

The main object of the invention is to produce an improved clutch, for use, for example, in a paper box making machine in which a partially finished pasteboard box is moved by the operator against a triggerlike member which, through associated mechanism, will operate a controller member and initiate the power-operated device which, in turn, will cause the clutch of the box making machine to become engaged. The clutch is especially adapted for use in the machine of the above type that is shown in applicant's prior application for Letters Patent of the United States, Serial No. 153,400 filed July 13, 1937, upon which application Patent No. 2,186,977 was granted on January 16, 1940. In view of its extreme sensitivity, movement of the controller member, through the trigger and associated mechanism, is assured, even when the pasteboard of which the box is made is light and flexible. However, the clutch is applicable for any purpose where a clutch having a sensitive control is to be desired.

A further object of the invention is to produce a clutch which, after having been started by mechanism of the above type, will stop upon a reverse movement of the controller member (when moved by the above-mentioned associated mechanism of the driven machine), the parts of the clutch then returning to their original position preparatory to the next operation thereof.

A feature of the invention consists of a screw and a ball-bearing nut in which relative movement between the two can be initiated by a sensitive member, or controller, this relative movement finally bringing the driving and driven clutch members into firm engagement to drive the mechanism which is to be operated by the driven clutch member.

Another feature of the invention consists of a friction device for controlling the relative movement of the screw and nut after the movement has been initiated. The friction device is so designed that slippage will take place as soon as the friction thereof exerts sufficient force to bring the clutch members into complete engagement, the slippage continuing to maintain the engagement during the operation of the driven member.

A further feature of the invention consists of means for releasing the friction controlled device and permitting all parts of the clutch to return to normal position upon a reverse movement of the controller member.

These and other features of the invention, including certain details of construction and combination of parts, will be described as embodied in the illustrated mechanism and will be pointed out in the appended claims.

Referring to the accompanying drawings,

Fig. 1 is a front elevation, partly in section, of the principal features of the clutch in disengaged position;

Fig. 2 is a similar view with the parts in engaged position;

Fig. 3 is a sectional view taken on the line III—III of Fig. 1, and looking in the direction of the arrow;

Fig. 4 is a front elevation of the friction mechanism which controls the engagement of the clutch;

Fig. 4ª is a perspective view, showing in detail the friction band of the friction mechanism illustrated in Fig. 4; and Fig. 5 shows the trigger and associated mechanism of a box making machine, such as has been referred to, by which the controller member is operated.

Referring more specifically to the drawings, the above-mentioned box making machine is driven by a gear 60. For driving and controlling this gear there is a pinion 62 secured to a driven clutch member 64 by means of bolts 66. The driven clutch member 64 is loosely mounted on a driving shaft 68 which has keyed to it a driving clutch member 70, provided with a friction facing 72.

Engagement of the clutch is effected by causing a nut 74 to travel by power along a continuously rotating screw 76 (keyed to the shaft 68) until the nut forces the clutch members into complete engagement, the travel being caused by yieldingly preventing rotation of the nut by a friction device, as will be described later. A series of balls 78 are provided between the screw 76 and nut 74 to form a ball bearing for the nut. Thus the rotation of the screw causes only a very slight drag upon the nut when there is relative movement between them. The nut and screw rotate together when the clutch is disengaged.

The mechanism for yieldingly preventing rotation of the nut 74, so that it will travel along the screw 76, includes a ratchet wheel 80, which is loosely mounted on one end of the nut and is co-axial therewith. This wheel is provided with a lug 82 which projects toward the opposite end of the nut and just clears its outside cylindrical surface. A friction band 100, shown in detail in Figs. 4 and 4ª, is wrapped around this surface, adjacent to the ratchet wheel 80, and makes nearly two parallel convolutions around it. The center portion of the band is common to both convolutions. The band 100 is maintained in this wrapped condition and in yielding frictional engagement with the nut, by two tension springs 102 and 104, which draw the ends of the band together and cause it to act similar to a rope wrapped around a windlass. The lug 82 on the ratchet wheel extends into a space 108 between the ends 110 and 112 of the first convolution of the friction band 100 and is in contact with the end 110 to form a yielding frictional connection between the ratchet wheel 80 and the nut 74.

The clutch is started and stopped by a controller member 114 which may be operated in any suitable manner, according to the type of machine in which the clutch is incorporated.

As shown herein, the controller member 114 is operated by a trigger 116 and its associated mechanism in the box making machine, as is fully described in said application. The controller member has connected to it a pivoted pawl 118 which is positioned, when such mechanism is operated, to engage one of the ratchet teeth of the wheel 80, to stop it from rotating with the rotating screw 76 and nut 74.

When the wheel 80 is stopped, the lug 82 thereon, which is in contact with the end 110 of the friction band, prevents the band from rotating and the friction between the band 100 and nut 74 accordingly stops the rotation of the nut. Therefore, the nut is moved to the left (Figs. 1 and 2) by the continuously rotating screw 76 until the end of the nut engages a ball bearing 120 and moves the driven clutch member 64 to the left, against the force of the clutch separating spring 122, until it firmly engages the driving clutch member 70, through its facing 72, and starts the box making machine through the gears 62 and 60.

When the nut meets sufficient resistance in driving the machine, the friction band starts to slip on the nut, but the slippage automatically adjusts itself, as explained below so that the nut maintains the clutch in engagement without slippage between its members. The friction is automatically released slightly to maintain this condition when the pressure of the end 110 against the lug 82 tends to unwrap the friction band 100 partially from the outside surface of the nut 74. Thus, this friction automatically adjusts itself to the point where it forces the nut sufficiently to maintain the clutch in engagement.

The machine is stopped at the completion of its cycle of operations by a cam connected to the gear 60, as described in said application. This cam, and its associated mechanism, lifts the controller member 114 and frees the pawl 118 from the ratchet wheel 80. The clutch separating spring 122 then disengages the clutch and forces the driven clutch member 64 to the right against two diametrically opposite brake members, one of which, 124, is shown diagrammatically in Figs. 1 and 2. This movement turns the ball-bearing nut 74 on the screw 76 and, when the nut is free from the load of the clutch separating spring, which load is taken by the brake, a final turning of the nut to normal position is accomplished by the expansion of a compression spring 126 (Figs. 1 and 3) which rotates the nut to a limited extent relatively to the screw. This rotation is effected because one end of the spring abuts a pin 128 located in the nut and the other end abuts a pin 130 located in the screw, this spring having been previously compressed additionally during the relative rotation of the screw and nut while engaging the clutch. The parts are now in normal position, the screw 76, the nut 74 and the ratchet wheel 80 all revolving together, driven only by the slight friction between the screw and the ball-bearing nut. Under these conditions, the nut is prevented by the ball bearing 120 from traveling along the screw sufficiently to engage the clutch because the slight friction between the screw and nut is insufficient to compress the clutch separating spring 122.

The nut is arranged to make less than one-half a revolution relative to the screw to produce proper engagement of the clutch. To prevent more than such half revolution, whenever the clutch is improperly adjusted or becomes worn, the nut is prevented from turning more than this amount by means of a stop pin 132 having a threaded end, and located in the nut, and a stop pin 134 projecting from the screw (Fig. 1). If the nut should rotate one-half of a revolution, these pins will come into contact and force the nut to travel under the friction band 100. When this condition occurs, the clutch should, of course, be readjusted so that engagement of the clutch takes place before the pins 132 and 134 come into such contact.

When it is necessary to disengage the clutch manually, in case of accident or trouble in the box making machine, it may be done easily by rotating a safety handle 136, pivoted at 138 on the frame of the machine. When this is done, an offset arm 140, connected with the handle, lifts a pin 142 on the controller member 114, thereby lifting it and the pawl 118 so that the ratchet wheel 80 will rotate and allow the clutch to become disengaged, as above described.

Having thus described the invention, what I claim as new and desire to secure by Letters Patent of the United States is:

1. A power-controlled clutch having, in combination, a power-operated shaft, a driving member and a feed screw, both rotatable with the shaft, a driven member loose on the shaft and axially movable thereon into engagement with the driving member, a nut in engagement with the screw and arranged to rotate normally therewith, a friction member carried by the nut and normally rotatable therewith, controlled means to prevent rotation of the friction member thereby preventing rotation of the nut and causing it to travel along the screw to force the driven member axially along the shaft into driving engagement with the driving member, said friction member acting to cause a partial disconnection between the friction member and the nut when the nut has reached the end of its travel so as to permit slippage between the nut and the friction member while maintaining sufficient friction to keep the clutch members in engagement, and a spring acting to separate the driven member from the driving member when release of the controlled means permits rotation of said friction member and nut.

2. A power-controlled clutch having, in combination, a power-operated shaft, a driving member and a feed screw, both rotatable with the shaft, a driven member loose on the shaft and axially movable thereon into engagement with the driving member, a nut in engagement with the screw and arranged to rotate normally therewith, a friction band wrapped around the nut and normally rotatable therewith, a stop which may be rendered operative to prevent rotation of the band and thereby by its friction preventing rotation of the nut and causing it to travel along the screw to force the driven member axially along the shaft into driving engagement with the driving member, said stop acting to cause a partial unwrapping of the band when the nut has reached the end of its travel so as to permit slippage between the nut and band while maintaining sufficient friction to keep the clutch members in engagement, and means acting to separate the driven member from the driving member when the stop is rendered inoperative so that the friction member and nut will rotate with the screw.

3. A power-controlled clutch having, in combination, a power-operated shaft, a driving member and a feed screw, both rotatable with the shaft, a driven member loose on the shaft and axially movable thereon into engagement with the driving member, a nut in engagement with the screw and arranged to rotate normally therewith, a friction band wrapped around the nut, spring means for drawing the ends of the band together, a stop which may be rendered operative to prevent rotation of the band and thereby by its friction preventing rotation of the nut and causing it to travel along the screw to force the driven member axially along the shaft into driving engagement with the driving member, said stop acting automatically to cause a partial unwrapping of the band when the nut has reached the end of its travel so as to permit slippage between the nut and band while automatically maintaining sufficient friction to keep the clutch members in engagement, and means acting to separate the driven member from the driving member when the stop is rendered inoperative so that the friction member and nut will rotate with the screw.

4. A power-controlled clutch having, in combination, a continuously rotating driving shaft, a screw, a driving clutch member, said screw and said member being mounted to turn with the shaft, a driven clutch member loose on the shaft and axially movable thereon into engagement with the driving member, a nut in threaded engagement with the screw and normally rotating therewith, a ratchet wheel freely mounted coaxially on the nut, a lug extending from the ratchet wheel, a friction band wrapped around the outside surface of the nut, tension means for drawing the ends of the band together, one end of the band being arranged to contact with said lug, a pawl arranged to be moved into engagement with the wheel to stop its rotation and thereby stop the rotation of the nut through the engagement of the lug and the friction band, the stopping of the rotation of the nut causing it to travel in threaded engagement along the screw to move the driven member axially along the shaft to force the driving and driven members into engagement with each other with driving pressure, said friction band permitting slippage between it and the nut after the nut has traveled on the screw sufficiently to maintain driving pressure between the clutch members, means to disengage the pawl and permit free rotation of the friction band and nut with the screw to relieve driving pressure between the clutch members, and means to separate said members from each other.

CUTLER D. KNOWLTON.